(12) United States Patent
Ma et al.

(10) Patent No.: US 11,944,066 B2
(45) Date of Patent: Apr. 2, 2024

(54) PET CAT EXCREMENT SCREENING DEVICE

(71) Applicant: PETKIT NETWORK TECHNOLOGY(SHANGHAI) CO., LTD., Shanghai (CN)

(72) Inventors: Yunxin Ma, Shanghai (CN); Xiaoqing Ma, Shanghai (CN); Xin Shi, Shanghai (CN); Weike Guo, Shanghai (CN); Weixue Guo, Shanghai (CN); Junchao Zhang, Shanghai (CN)

(73) Assignee: PETKIT NETWORK TECHNOLOGY(SHANGHAI) CO., LTD. (CN)

( * ) Notice: Subject to any disclaimer, the term of this patent is extended or adjusted under 35 U.S.C. 154(b) by 240 days.

(21) Appl. No.: 17/617,103

(22) PCT Filed: May 20, 2021

(86) PCT No.: PCT/CN2021/094762
§ 371 (c)(1),
(2) Date: Dec. 7, 2021

(87) PCT Pub. No.: WO2022/110690
PCT Pub. Date: Jun. 2, 2022

(65) Prior Publication Data
US 2023/0247967 A1 Aug. 10, 2023

(30) Foreign Application Priority Data

Nov. 26, 2020 (CN) .......................... 202011348219.2

(51) Int. Cl.
*A01K 1/01* (2006.01)
*B07B 1/28* (2006.01)
(Continued)

(52) U.S. Cl.
CPC ............ *A01K 1/0114* (2013.01); *A01K 1/011* (2013.01); *B07B 1/28* (2013.01); *B07B 1/42* (2013.01); *B07B 1/469* (2013.01)

(58) Field of Classification Search
CPC .... A01K 1/0114; A01K 1/011; A01K 1/0107; B07B 1/28; B07B 1/42; B07B 1/469
(Continued)

(56) References Cited

U.S. PATENT DOCUMENTS 1,562,671 A * 11/1925 Zeitler ................... B61H 13/04
74/393
4,061,111 A * 12/1977 Smith ................... A01K 1/0114
119/672
(Continued)

FOREIGN PATENT DOCUMENTS

CN 209017617 U 6/2019
CN 110089440 A 8/2019
(Continued)

OTHER PUBLICATIONS

Extended European Search Report dated Jun. 14, 2023; European Patent Application No. 21815344.3.
(Continued)

*Primary Examiner* — Timothy D Collins
*Assistant Examiner* — Maria E Graber
(74) *Attorney, Agent, or Firm* — McDonald Hopkins LLC (57) ABSTRACT

Provided is a pet cat excrement screening device. The pet cat excrement screening device includes a support base; a drum rotatably mounted on the support base; and a drum driving device mounted on the support base. The drum is configured to rotate between a first position and a second position under drive of the drum driving device, where the rotation angle of the drum is less than 360 degrees. A side wall of the drum body of the drum is provided with a pet inlet. The pet inlet
(Continued)

is exposed out of the support base during a rolling process of the drum. A screening mechanism is mounted in the drum. The rear end of the drum is provided with a waste discharge port.

8 Claims, 13 Drawing Sheets

(51) Int. Cl.
  *B07B 1/42* (2006.01)
  *B07B 1/46* (2006.01)
(58) Field of Classification Search
  USPC .......................................................... 119/166
  See application file for complete search history.

(56) References Cited

U.S. PATENT DOCUMENTS

| | | | | |
|---|---|---|---|---|
| 4,120,264 | A * | 10/1978 | Carter | A01K 1/0114 119/166 |
| 5,048,464 | A * | 9/1991 | Shirley | A01K 1/0114 209/362 |
| 5,662,066 | A * | 9/1997 | Reitz | A01K 1/0114 119/163 |
| 5,911,194 | A * | 6/1999 | Pierson, Jr. | A01K 1/0114 119/166 |
| 6,463,881 | B2 * | 10/2002 | Reitz | A01K 1/0114 119/170 |
| 8,757,094 | B2 * | 6/2014 | Baxter | A01K 1/011 119/168 |
| 9,185,879 | B2 * | 11/2015 | Bellini | A01K 1/0114 |
| 10,098,315 | B2 * | 10/2018 | Couto | A01K 1/0114 |
| 11,432,525 | B2 * | 9/2022 | Ma | A01K 1/0114 |
| 11,523,586 | B2 * | 12/2022 | Baxter | A01K 1/011 |
| 2008/0017123 | A1 * | 1/2008 | Chin | A01K 1/011 119/166 |
| 2009/0107408 | A1 | 4/2009 | Waters | |
| 2013/0333625 | A1 * | 12/2013 | Baxter | A01K 1/0114 119/166 |
| 2014/0245960 | A1 * | 9/2014 | Baxter | A01K 1/011 119/166 |
| 2020/0060221 | A1 * | 2/2020 | Fan | A01K 1/0114 |
| 2022/0125006 | A1 * | 4/2022 | Smith | A01K 1/0114 |

FOREIGN PATENT DOCUMENTS

| | | | |
|---|---|---|---|
| CN | 110169368 | A * | 8/2019 |
| CN | 209964908 | U | 1/2020 |
| CN | 210094294 | U | 2/2020 |
| CN | 210382181 | U | 4/2020 |
| CN | 111296303 | A | 6/2020 |
| CN | 210746594 | U | 6/2020 |
| CN | 211064559 | U | 7/2020 |
| CN | 111802256 | A | 10/2020 |
| CN | 111837972 | A | 10/2020 |
| CN | 112452731 | A | 3/2021 |
| KR | 20190073048 | A | 6/2019 |
| KR | 101961381 | B1 | 7/2019 |
| KR | 20200119093 | A | 10/2020 |

OTHER PUBLICATIONS

International Search Report dated Aug. 2021; International Patent Application No. PCT/CN2021/094762 filed May 20, 2021.

* cited by examiner

PET CAT EXCREMENT SCREENING DEVICE

CROSS-REFERENCE TO RELATED APPLICATION(S)

This is a national stage application filed under 37 U.S.C. 371 based on International Patent Application No. PCT/CN2021/094762, filed May 20, 2021, which claims priority to Chinese Patent Application No. 202011348219.2 filed Nov. 26, 2020, the disclosures of which are incorporated herein by reference in their entireties.

TECHNICAL FIELD

The present application relates to the technical field of pet supplies, for example, a pet cat excrement screening device.

BACKGROUND

As people's material living standards continue to improve, the requirement for spiritual life is also gradually improving, so more and more people like to keep pet cats. Although many cat lovers like pet cats very much, they don't have time to clean up the excrement produced by pet cats. Therefore, special full-automatic pet cat toilets are invented. Among the existing automatic pet cat toilets, drum-type automatic pet cat toilets based on the principle of gravity screening have increasingly become the mainstream in the development of similar products due to their high efficiency, stability and ease of maintenance.

In the related art, almost all the drum-type automatic pet cat toilets based on the principle of gravity screening need to rely on sensor detection and software algorithms to ensure the safety of pets during use. However, various sensors inevitably have probabilistic failures in practical applications, causing the sudden rotation of the drum when a pet cat is excreting. As a result, the life of the pet cat is subjected to threat since the shell of the drum has a shearing effect on the pet cat. Therefore, real safety protection cannot be achieved.

SUMMARY

An embodiment provides a pet cat excrement screening device. The pet cat excrement screening device includes a support base; a drum rotatably mounted on the support base; and a drum driving device mounted on the support base. The drum is configured to rotate between a first position and a second position under drive of the drum driving device, where the rotation angle of the drum is less than 360 degrees.

A side wall of the drum body of the drum is provided with a pet inlet, and the pet inlet is exposed out of the support base during a rolling process of the drum.

A screening mechanism is mounted in the drum. The screening mechanism includes a screening net and a spiral collection bin. A rear end of the drum is provided with a waste discharge port. The spiral collection bin has a helicoid spirally curved towards the waste discharge port. During the rolling process of the drum, the screening net is configured to screen out excrement of a pet cat onto the helicoid and screen out cat litter into a space between the spiral collection bin and a drum wall of the drum, and the helicoid is configured to guide the excrement into the waste discharge outlet with rotation of the drum.

In an alternative embodiment, the drum driving device includes a drive gear, the rear end of the drum is provided with a driven gear meshed with the drive gear, the driven gear is an incomplete gear, and a central angle between two ends of gear teeth of the driven gear is less than 360 degrees.

In an alternative embodiment, the two ends of the gear teeth of the driven gear are provided with limit teeth.

In an alternative embodiment, the screening mechanism is secured between a front end surface of the drum and a rear end surface of the drum, the spiral collection bin and the screening net are secured relative to each other in the up and down direction, and the screening net is evenly provided with a plurality of screening holes.

In an alternative embodiment, the diameter of each of the plurality of screening holes is larger than the diameter of one piece of the cat litter and smaller than the diameter of one piece of the excrement of the pet cat.

In an alternative embodiment, the diameter of the each of the plurality of screening holes is between 2 mm and 10 mm.

In an alternative embodiment, the helicoid of the spiral collection bin is curved towards the rotation axis of the drum along the direction extending from the lower end of the helicoid to the upper end of the helicoid, and the helicoid is curved towards the drum wall of the drum along the direction extending from the front end of the helicoid to the rear end of the helicoid.

In an alternative embodiment, a deflector is mounted in the drum, a first end of the deflector is secured to the waste discharge port, a second end of the deflector abuts the spiral collection bin, the deflector has a deflector surface curved towards the waste discharge port, and the deflector surface is connected to the helicoid.

In an alternative embodiment, an inner wall of the support base abutting the drum is symmetrically provided with a plurality of support wheels.

In an alternative embodiment, a waste discharge box is further included. The waste discharge box is mounted on the support base, and the waste discharge box is located directly below the waste discharge port.

In an alternative embodiment, an upper cover is included. The upper cover is mounted on the support base, and the upper cover covers the drum.

REFERENCE LIST 1 support base
11 mounting groove
2 drum
21 pet inlet
22 driven gear
221 limit tooth
23 waste discharge port
24 front opening
3 drum driving device
31 drive gear
4 screening mechanism
41 screening net
411 screening hole
42 spiral collection bin
421 helicoid
5 deflector
51 deflector surface
6 support wheel
7 waste discharge box
8 upper cover

DETAILED DESCRIPTION

In the description of the present application, unless otherwise expressly specified and limited, the term "connected to each other", "connected" or "secured" is to be construed in a broad sense, for example, as securely connected, detachably connected, or integrated; mechanically connected or electrically connected; directly connected to each other or indirectly connected to each other via an intermediary; or internally connected between two elements or interaction relations between two elements. For those of ordinary skill in the art, specific meanings of the preceding terms in the present application may be construed according to specific circumstances.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of the present application, orientations or position relations indicated by terms such as "above", "below", "right" and the like are orientations or position relations based on the drawings. These orientations or position relations are intended only to facilitate and simplify the description of the present application, and not to indicate or imply that a device or element referred to must have such specific orientations or must be configured or operated in such specific orientations. Thus, these orientations or position relations are not to be construed as limiting the present application. In addition, the terms "first" and "second" are used only to distinguish between descriptions and have no special meaning.

Figure 1:
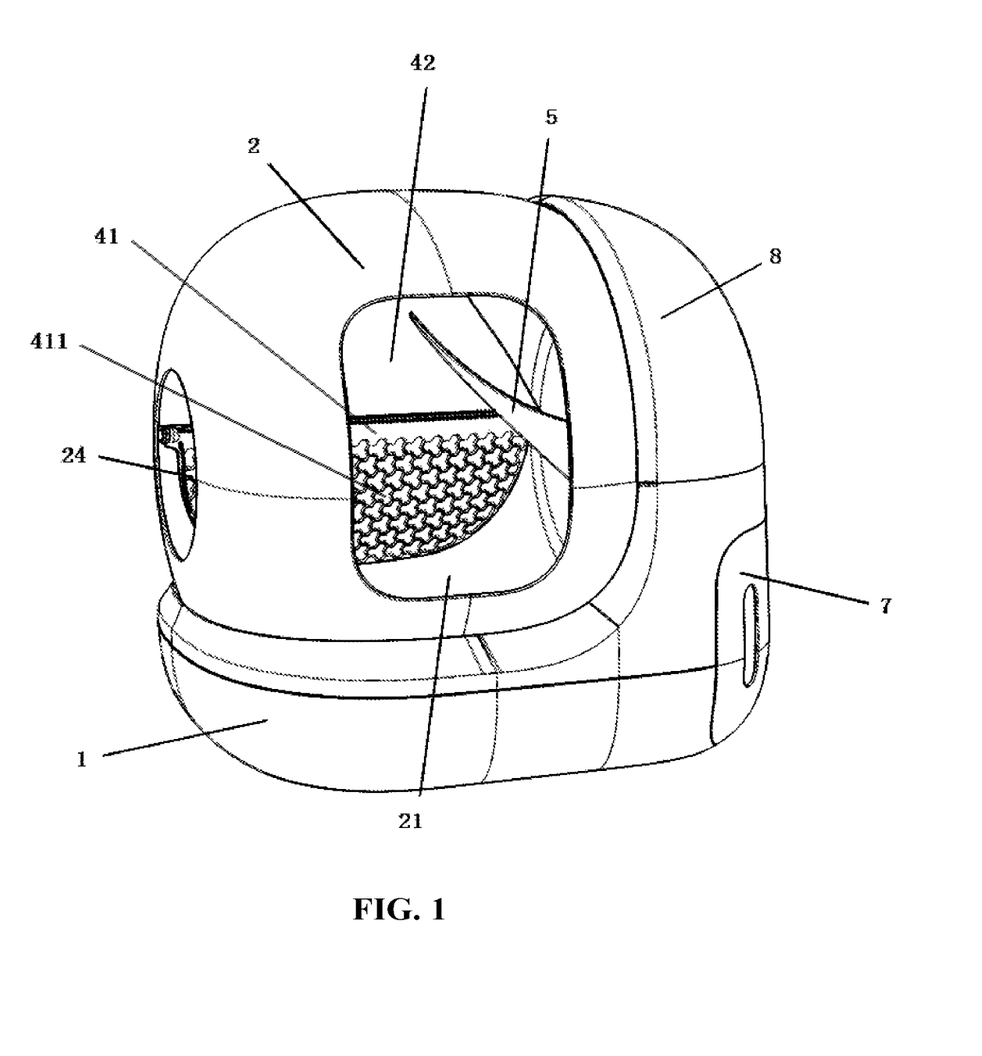
FIG. 1 is a structural view of a pet cat excrement screening device according to an embodiment of the present application.
Figure 2:
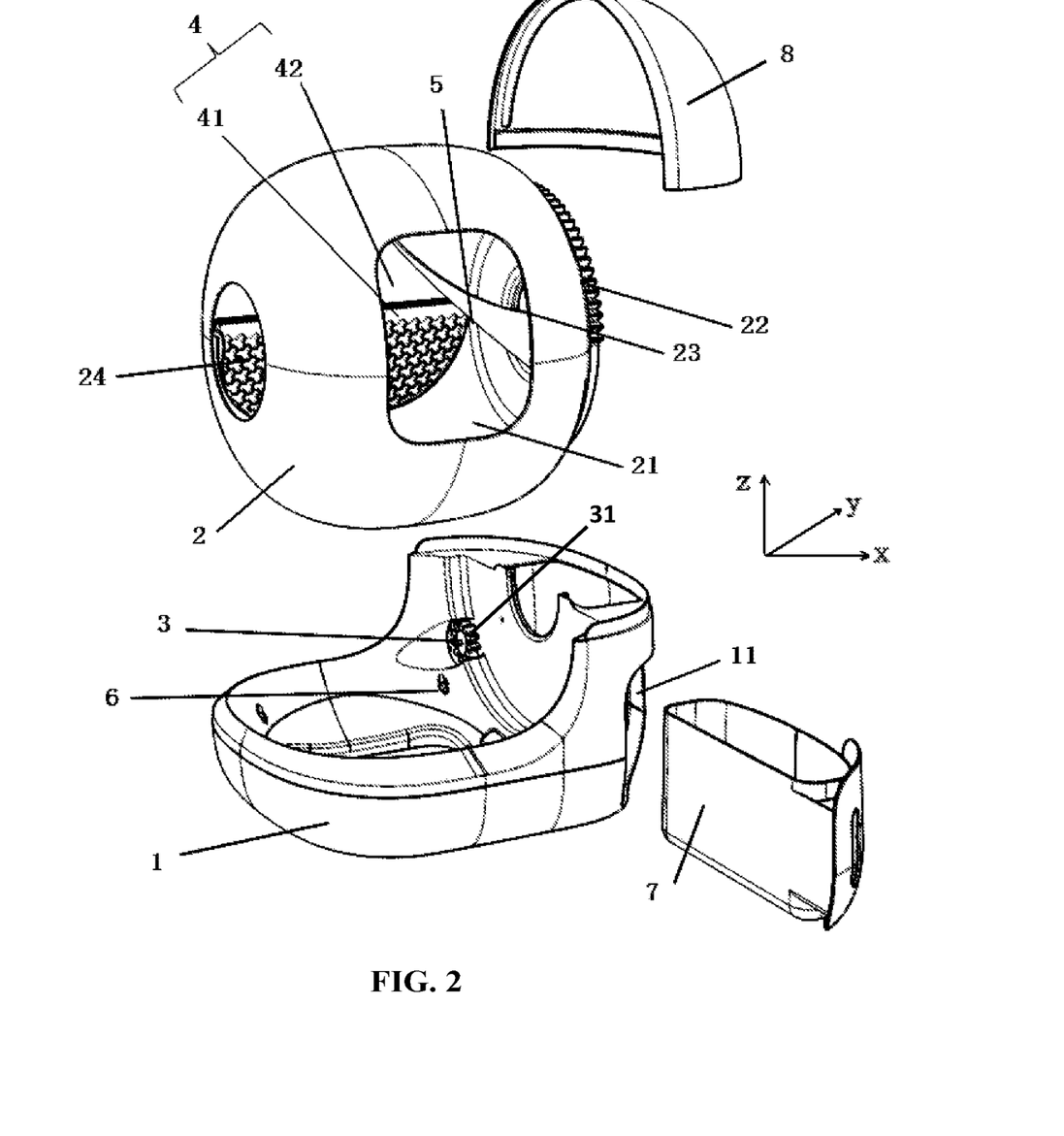
FIG. 2 is an exploded view of a pet cat excrement screening device according to an embodiment of the present application.

As shown in FIG. 1 and FIG. 2, the embodiment of the present application provides a pet cat excrement screening device for pet cat excreting and for screening the excrement of the pet cat. The pet cat excrement screening device includes a support base 1; a drum 2 rotatably mounted on the support base 1; and a drum driving device 3 mounted on the support base 1. The drum 2 rests on the drum driving device 3 and is configured to rotate under drive of the drum driving device 3, where the rotation angle of the drum 2 is less than 360 degrees.

The drum 2 is used for holding cat litter. A side wall of the drum body of the drum 2 is provided with a pet inlet 21, and the pet inlet 21 is exposed out of the support base 1 during a rolling process of the drum 2. In this manner, if the drum 2 rotates by mistake when a pet cat is excreting, the pet cat can jump out of the pet inlet 21 in time, so that the safety of the pet cat is ensured. A screening mechanism 4 is mounted in the drum 2. A rear end of the drum 2 is provided with a waste discharge outlet 23. During the rolling process of the drum 2, the screening mechanism 4 is configured to screen out the excrement of the pet cat mixed in the cat litter and guide the excrement into the waste discharge outlet 23 to discharge the excrement.

The structure of the pet cat excrement screening device provided by the embodiment is shown in FIG. 2. For ease of description, a rectangular coordinate system is established in the direction shown in FIG. 2, specifying that the x-axis extends in the direction extending from the left side of the drum 2 to the right side of the drum 2, the y-axis extends in the direction extending from the front end of the drum 2 to the rear end of the drum 2, and the z-axis extends in the direction extending from the lower end of the drum 2 to the upper end of the drum 2. The support base 1 includes a support portion and a waste collection portion. The support portion supports the drum 2, and the waste collection portion is disposed at the waste discharge outlet 23 at the rear end of the drum 2. The inner side of the support portion is provided with a drum support groove that matches the outer contour of the drum 2, and the drum driving device 3 is mounted on a groove wall of the drum support groove. To improve the smoothness of the drum 2 rolling on the support base 1, the groove wall of the drum support groove is mounted with multiple support wheels 6. The multiple support wheels 6 are arranged symmetrically in pairs and may rotate freely with respect to the support base 1, so that the steady support to the drum 2 is ensured while the rolling smoothness of the drum 2 is improved.

A side surface of the waste collection portion of the support base 1 is provided with a mounting groove 11, and the mounting groove 11 is inserted with a waste discharge box 7. The waste discharge box 7 is directly below the waste discharge outlet 23 of the drum 2 and is configured to receive the excrement of the pet cat discharged from the waste discharge outlet 23.

The structure of the drum 2 is shown in FIGS. 2 to 6. The drum 2 is driven by the drum driving device 3. In the embodiment, the drum driving device 3 is a gear mechanism, including a drive gear 31. Accordingly, the rear end of the drum 2 is provided with a driven gear 22 meshed with the drive gear 31. To ensure that the rotation angle of the drum 2 is less than 360 degrees and the pet inlet 21 is exposed out of the support base 1 during the rotation of the drum 2, the driven gear 22 is an incomplete gear, that is, gear teeth of the driven gear 22 do not completely cover the outer circumference of a hub of the driven gear 22, and a central angle between two ends of the gear teeth, that is, the rotation angle of the drum 2, is less than 360 degrees. The center angle of the gear teeth is generally between 200 degrees and 240 degrees, and the specific angle may be selected according to the size of the opening of the pet inlet 21. To prevent over-rotation of the driven gear 22 and the drum 2, the two ends of the gear teeth of the driven gear 22 are provided with limit teeth 221.

In an embodiment, the drum driving device 3 further includes a driver (not shown) mounted in the support base 1, and an output shaft of the driver is directly or drivingly connected to the drive gear 31. In the embodiment, the driver may be a rotating electric machine.

In other embodiments, the drum driving device 3 may alternatively be a belt drive device, a chain drive device or a worm drive device, and accordingly, the rear end of the drum 2 is provided with a driven pulley, a driven sprocket or a worm wheel. The driving manner of the drum 2 is not limited in the present application.

Figure 3:
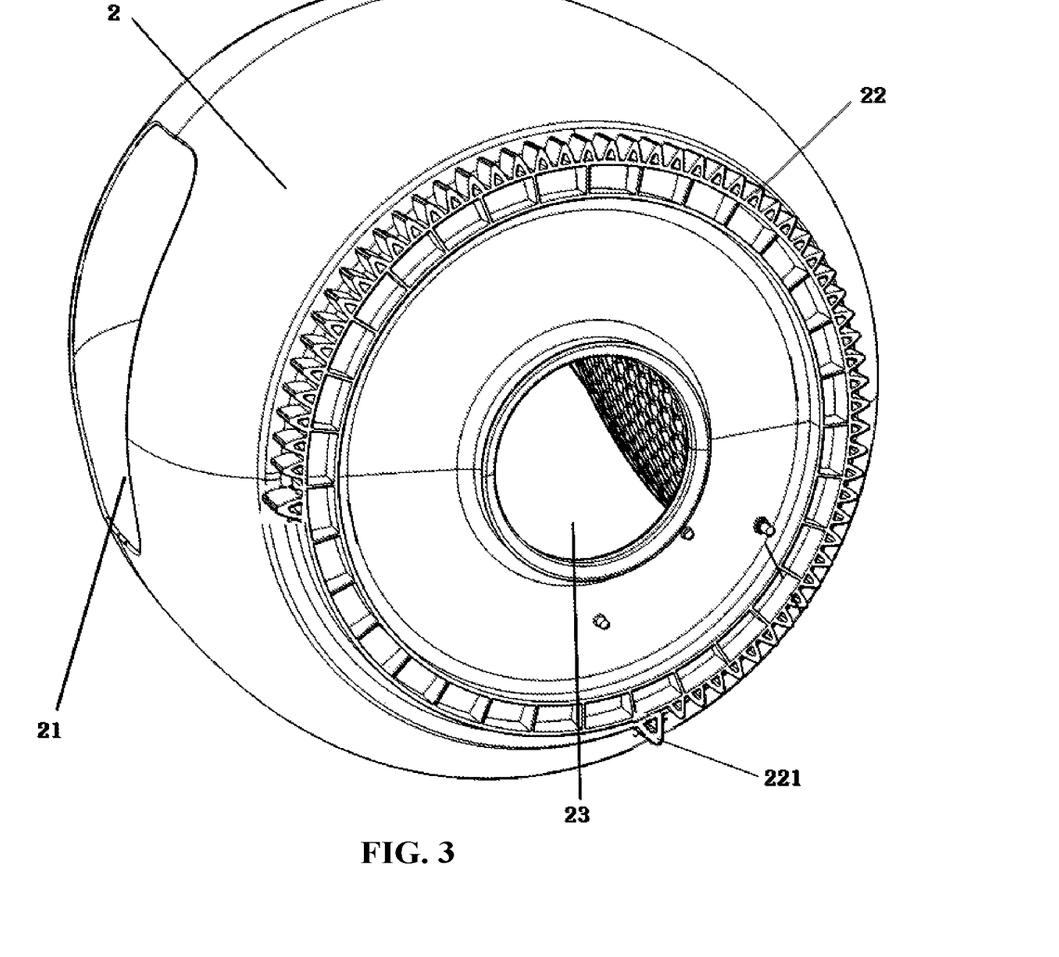
FIG. 3 is a structural view of a drum of a pet cat excrement screening device according to an embodiment of the present application.
Figure 4:
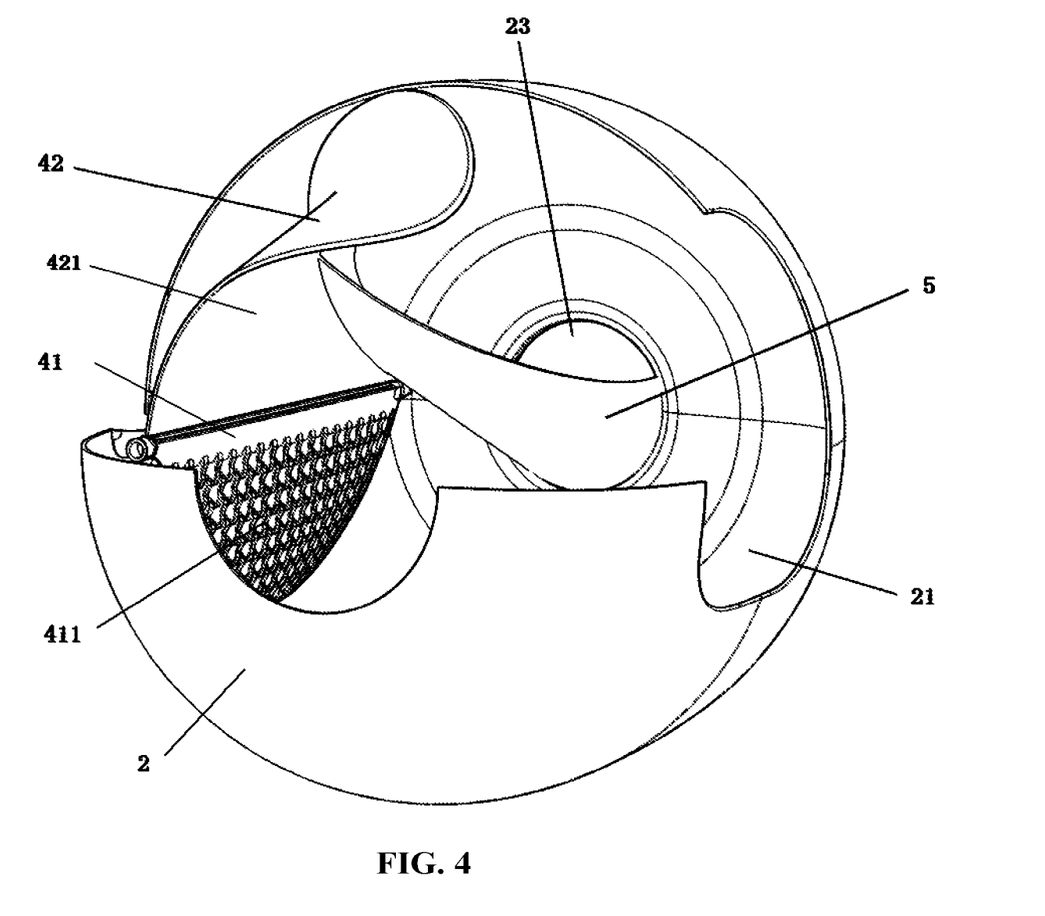
FIG. 4 is a schematic view showing the inner structure of a drum from a first viewpoint according to an embodiment of the present application.
Figure 5:
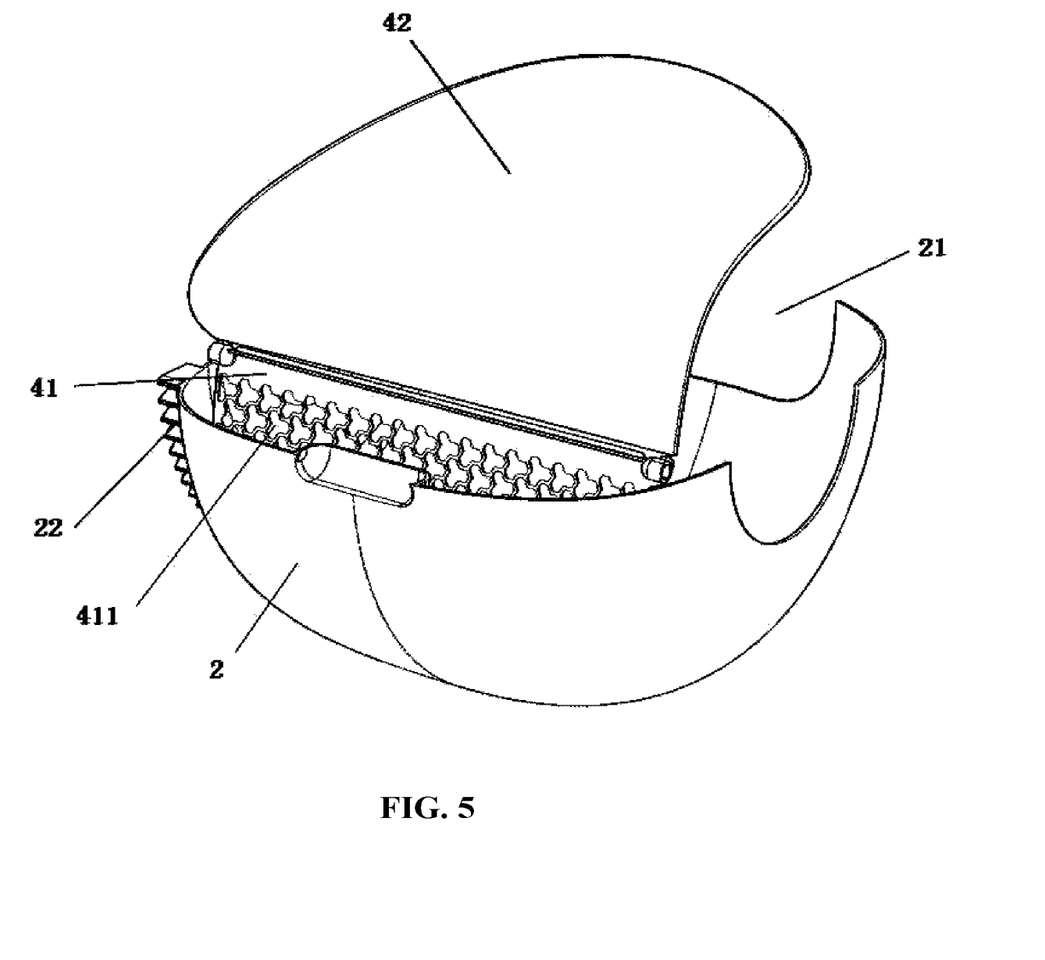
FIG. 5 is a schematic view showing the inner structure of a drum from a second viewpoint according to an embodiment of the present application.
Figure 6:
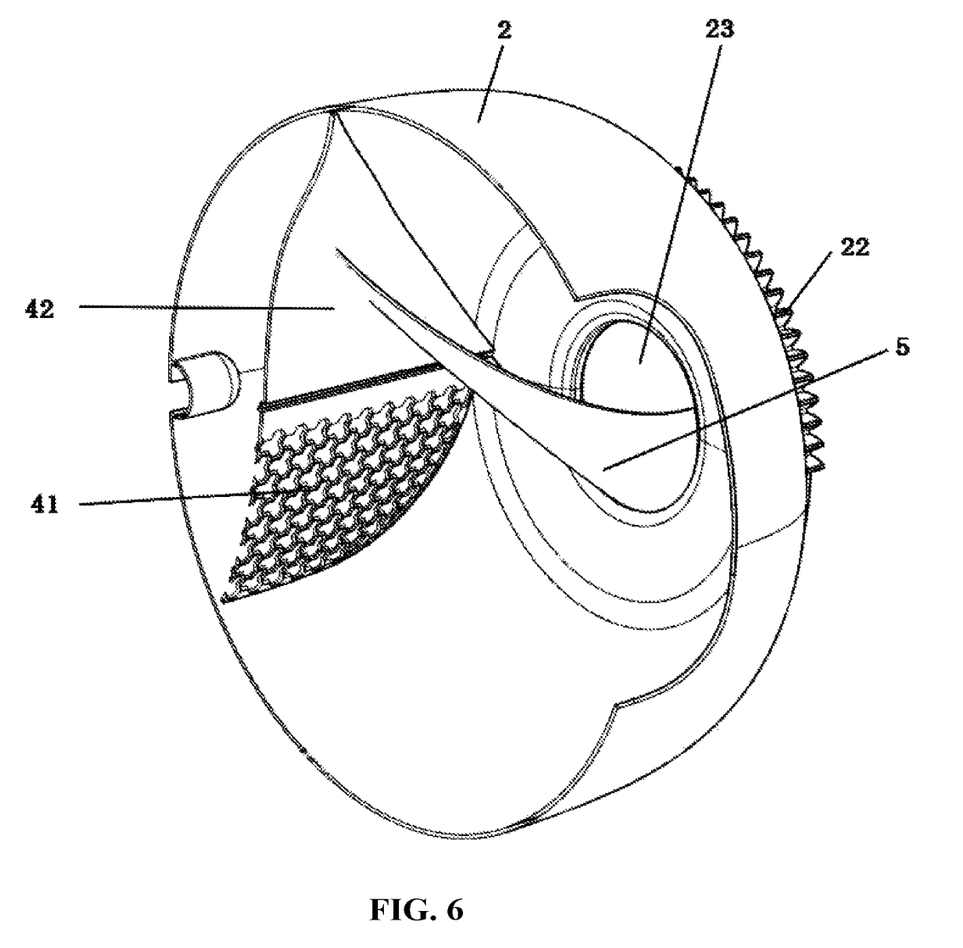
FIG. 6 is a schematic view showing the inner structure of a drum from a third viewpoint according to an embodiment of the present application.

The pet inlet 21 is provided on the side wall of the drum body of the drum 2. The size of the pet inlet 21 should allow an adult pet cat to enter. In the embodiment, the pet inlet 21 is set as a quadrangle having chamfers. In other embodiments, the pet inlet 21 may be set as a circle, which is not limited in the present application. When the drum 2 is in a first position or a second position, that is, when the drum 2 rotates to the left extreme position or the right extreme position, the side edge of an upper end of the pet inlet 21 is higher than the support base 1, so that a part of the pet inlet 21 is exposed out of the support base 1 for a pet cat jumping out of the pet inlet 21.

The front end of the drum 2 is provided with a front opening 24. The front opening 24 is directly opposite the waste discharge outlet 23 and is configured for the filling of cat litter or the observation of the excreting condition of the pet cat.

Figure 7:
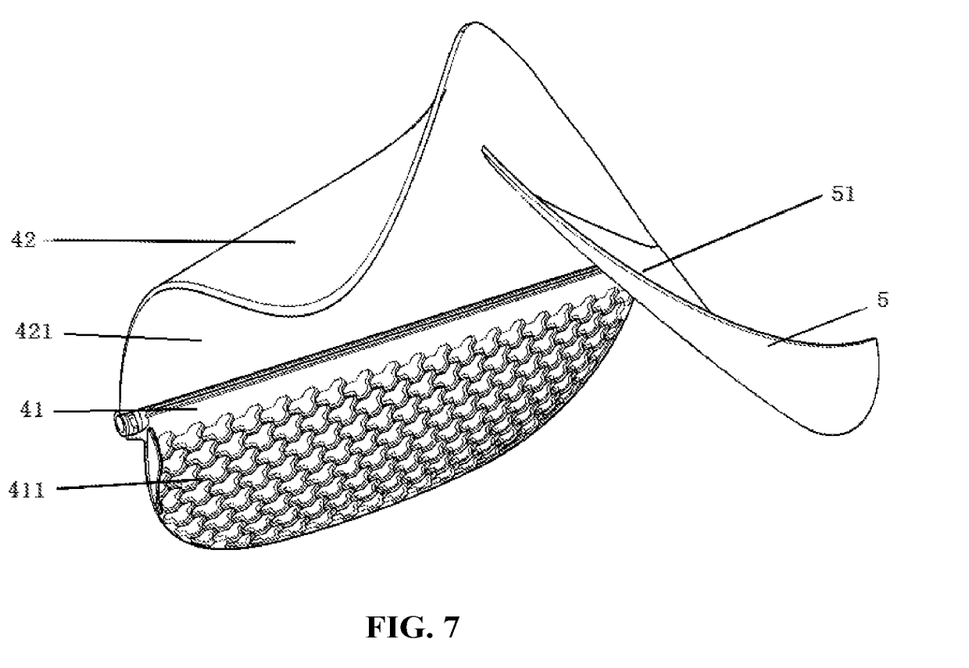
FIG. 7 is a structural view of a screening mechanism and a deflector according to an embodiment of the present application.

A screening mechanism 4 is mounted in the drum 2. The structure of the screening mechanism 4 is shown in FIG. 7. The screening mechanism 4 includes a screening net 41 and a spiral collection bin 42 secured relative to each other in the up and down direction. The spiral collection bin 42 has a helicoid 421 spirally curved towards the waste discharge outlet 23. The screening net 41 is evenly provided with multiple screening holes 411. The screening net 41 is configured to separate the excrement of the pet cat from the cat litter during the rotation of the drum 2, so that the excrement of the pet cat is screened onto the helicoid 421, and clean cat litter is screened between the spiral collection bin 42 and a drum wall of the drum 2. The excrement on the helicoid 421 further rolls down with the rotation of the drum 2 to the waste discharge outlet 23 and falls into the waste discharge box 7.

The front end of the spiral collection bin 42 and the rear end of the spiral collection bin 42 are secured to the inner wall of the front end of the drum 2 and the inner wall of the rear end of the drum 2 respectively. The screening net 41 is relatively secured to below the spiral collection bin 42. The screening net 41 is evenly provided with multiple screening holes 411. The diameter of each of the multiple screening holes 411 is slightly larger than the diameter of one piece of the cat litter and smaller than the diameter of one piece of the excrement of the cat, so that the screening net 41 can separate the excrement having a volume larger than the cat litter from the cat litter with the rotation of the drum 2. In an alternative embodiment, the diameter of the each of the multiple screening holes 411 is between 2 mm and 10 mm. The helicoid 421 of the spiral collection bin 42 is curved towards the rotation axis of the drum 2 along the direction extending from the lower end of the helicoid 421 to the upper end of the helicoid 421, and the helicoid 421 is curved towards the drum wall of the drum 2 along the direction extending from the front end of the helicoid 421 to the rear end of the helicoid 421. This shape of the helicoid 421 facilitates receiving the excrement of the pet cat and guiding the excrement towards the waste discharge outlet 23 with the rotation of the drum 2.

The screening net 41 is detachably connected to the spiral collection bin 42, so that the screening net 41 can be removed and assembled in time for cleaning or replacement. Two ends of the spiral collection bin 42 are provided with insertion holes, outer walls of the insertion holes are secured to the drum 2, and two ends of the screening net 41 are inserted into the insertion holes. The screening net 41 may rotate by a certain angle with respect to the spiral collection bin 42 so as to screen the excrement into the spiral collection bin 42. The insertion holes are provided with limit structures such as limit blocks, which are configured to limit the rotation angle of the screening net 41. The rotation angle of the screening net 41 is generally limited within 10 degrees.

In an embodiment, a deflector 5 is mounted in the drum 2. A first end of the deflector 5 is secured to the waste discharge outlet 23, and a second end of the deflector abuts the spiral collection bin 42. The deflector 5 also has a curved shape and has a deflector surface 51 curved towards the waste discharge outlet 23. The deflector surface 51 is connected to the helicoid 421, so that the excrement rolling to the tail end of the helicoid 421 can fall on the deflector surface 51 and be further guided into the waste discharge outlet 23, and thus the excrement is prevented from falling into the drum 2 again.

The pet cat excrement screening device provided by the embodiment further includes an upper cover 8. The upper cover 8 is mounted on the support base 1 and covers above the rear end of the drum 2. The upper cover 8 is configured to protect the drum 2 and the support base 1.

Working principles of the pet cat excrement screening device provided by the embodiment are shown in FIGS. 8 to 13.

Figure 8:
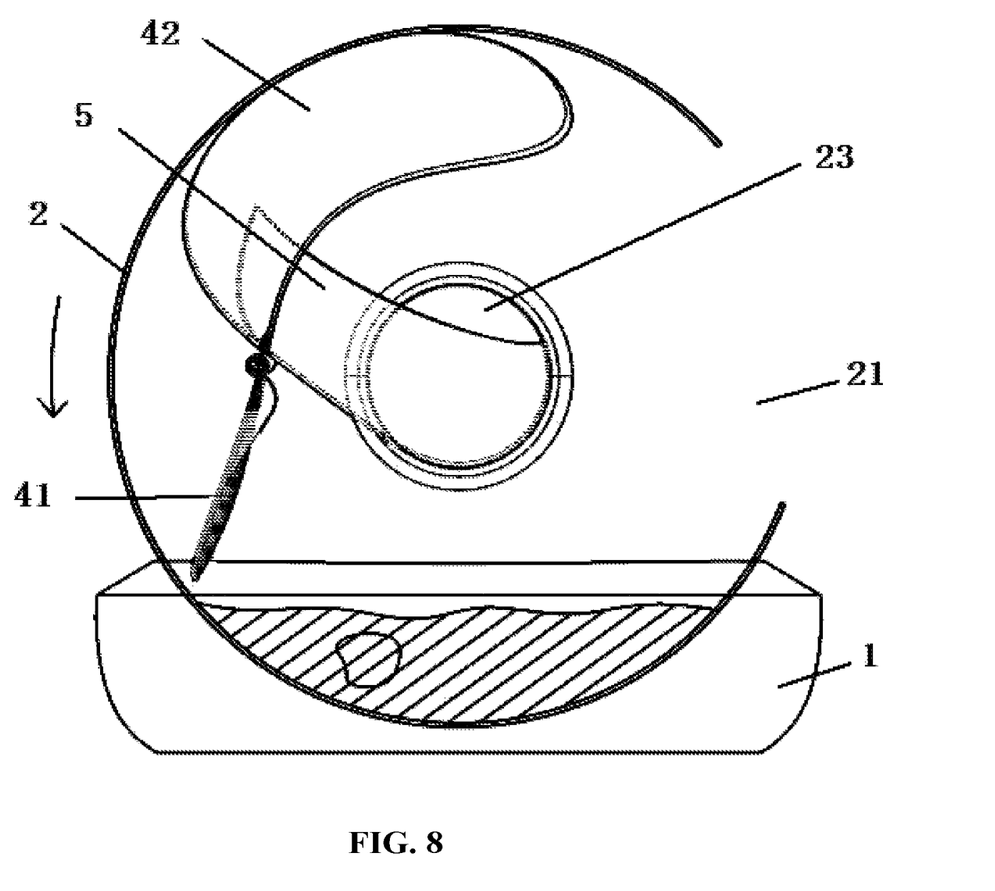
FIG. 8 is schematic view one showing the principles of a working process of a pet cat excrement screening device according to an embodiment of the present application.

The initial state of the device is shown in FIG. 8. When the screening of the excrement is started, the drum 2 rotates counterclockwise as viewed from the front end of the drum 2 towards the rear end of the drum 2, and the screening net 41 is inserted into the cat litter with the rotation of the drum 2 to start the separation of the excrement and the cat litter.

Figure 9:
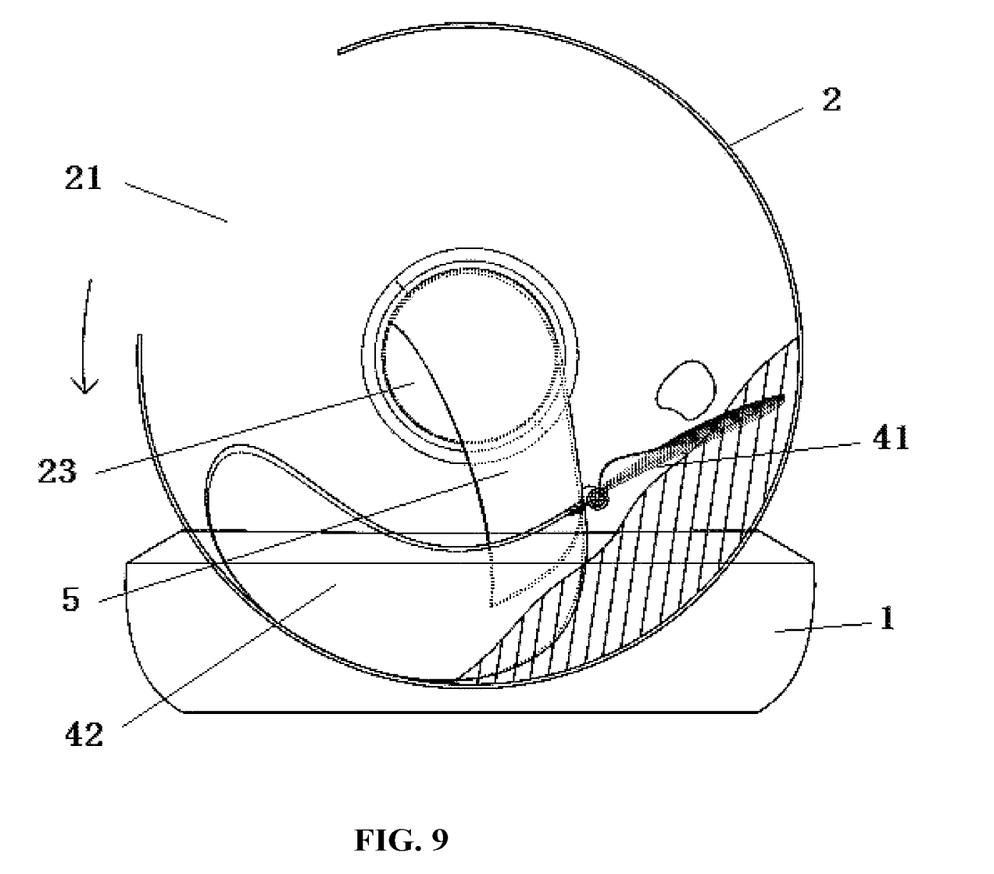
FIG. 9 is schematic view two showing the principles of a working process of a pet cat excrement screening device according to an embodiment of the present application.
Figure 10:
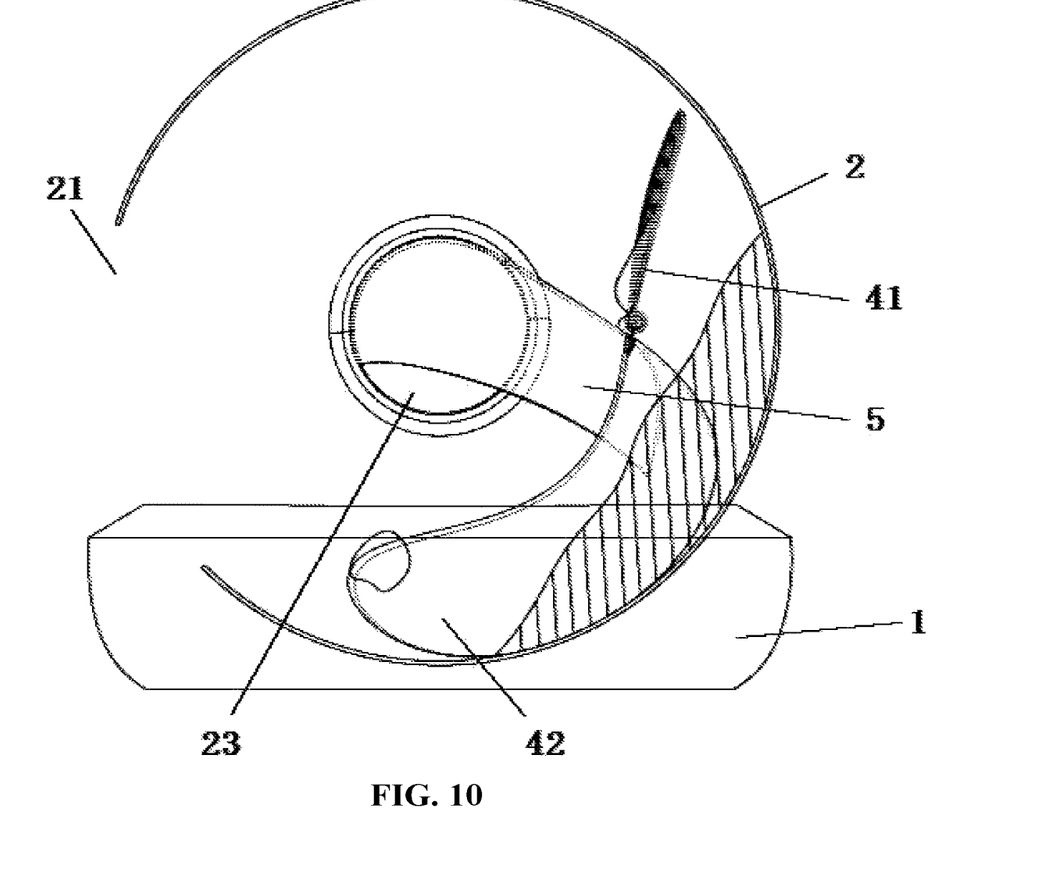
FIG. 10 is schematic view three showing the principles of a working process of a pet cat excrement screening device according to an embodiment of the present application.

With the rotation of the drum 2, clean cat litter is filtered to below the screening net 41 and enters between the spiral collection bin 42 and the inner wall of the drum 2, and the excrement of the pet cat is left on the screening net 41 due to the large volume. The drum 2 continues rotating to the second position, that is, the left extreme position; at this time, the clean cat litter has completely entered between the spiral collection bin 42 and the inner wall of the drum 2, and under gravity, the excrement rolls down onto the helicoid 421 from the screening net 41.

Figure 11:
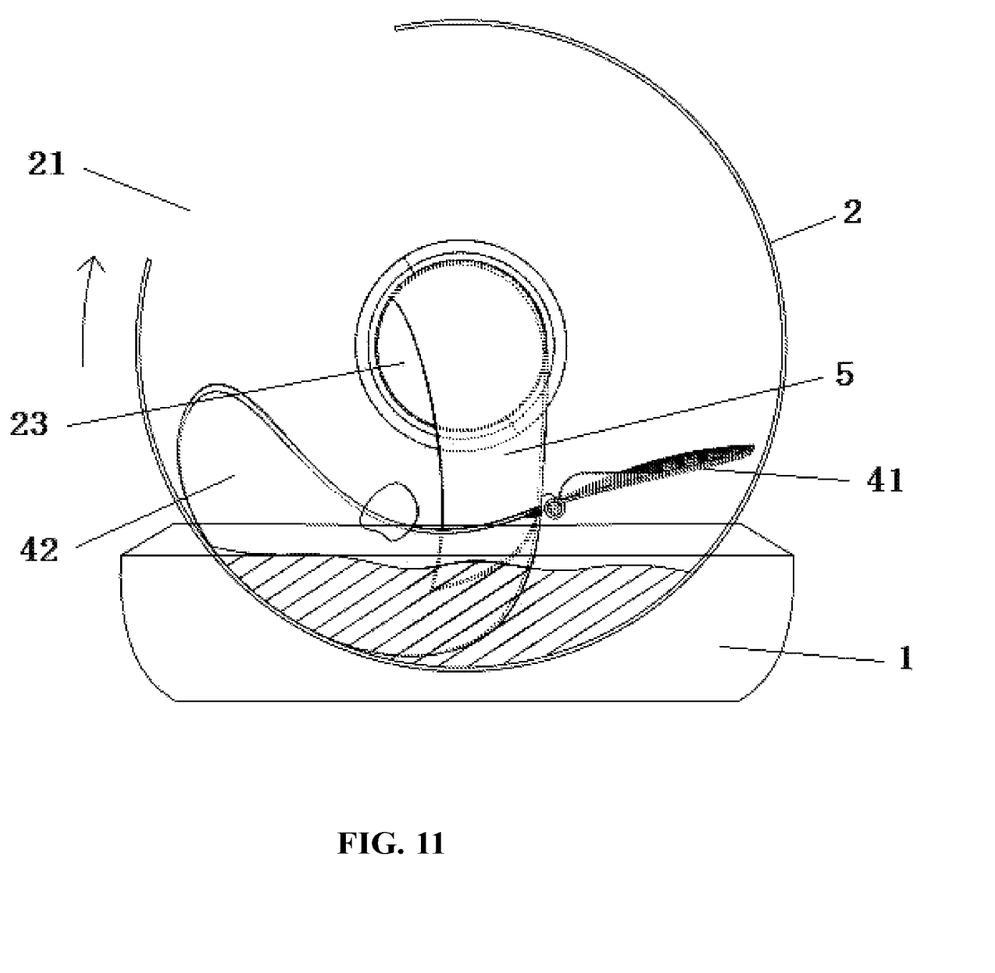
FIG. 11 is schematic view four showing the principles of a working process of a pet cat excrement screening device according to an embodiment of the present application.
Figure 12:
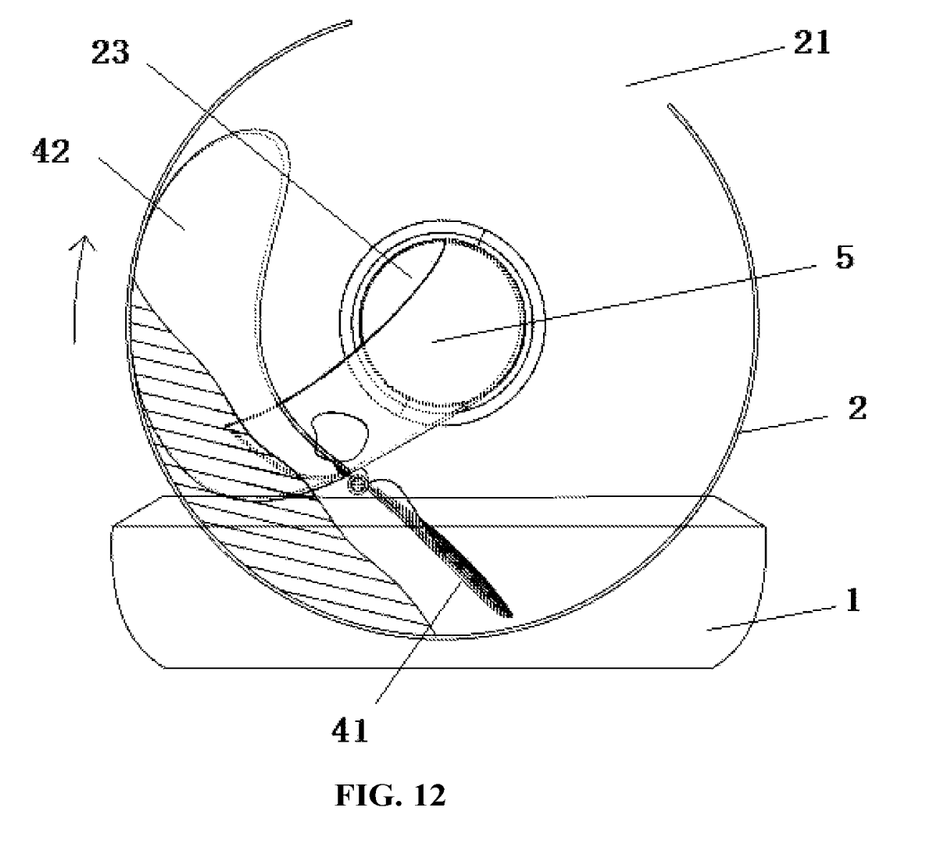
FIG. 12 is schematic view five showing the principles of a working process of a pet cat excrement screening device according to an embodiment of the present application.
Figure 13:
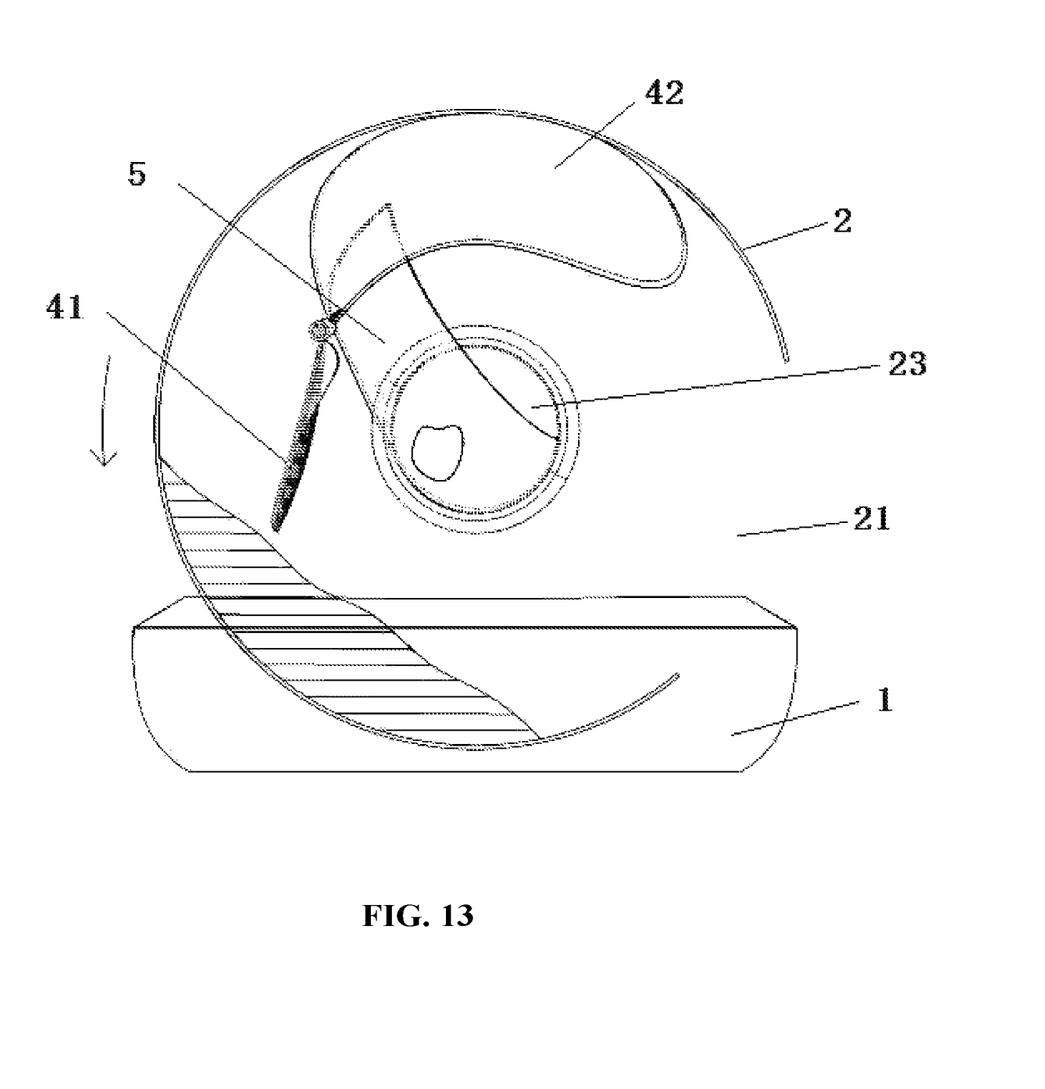
FIG. 13 is schematic view six showing the principles of a working process of a pet cat excrement screening device according to an embodiment of the present application.

The drum 2 starts to rotate clockwise. Under gravity, the excrement gradually approaches the waste discharge outlet 23 by rotating along the helicoid 421 and rolls onto the deflector 5, and the clean cat litter gradually flows out of the spiral collection bin 42. The drum 2 continues rolling clockwise to the first position, that is, the right extreme position. The excrement enters the waste discharge outlet 23 along the deflector 5, and the clean cat litter completely flows out of the spiral collection bin 42. Then, the drum 2 rotates counterclockwise to the initial position, at which point the sequential screening action ends.

During this process, the pet inlet 21 remains exposed out of the support base 1. That is, when the drum 2 is in the first position or the second position, the pet inlet 21 still has a relatively large area exposed out of the support base 1, so that the cat can freely enter and leave the drum 2 without being pinched.

The rotation angle of the drum 2 of the pet cat excrement screening device provided by the present application is less than 360 degrees, so that the pet inlet 21 provided on the side wall of the drum 2 is exposed out of the support base 1 during the rolling process of the drum 2. In this manner, if the drum 2 rotates by mistake, the pet cat can jump out of the pet inlet 21 in time, so that the safety hazards caused by the rotation of the drum 2 by mistake is effectively removed, and the safety of the pet cat excreting is fully ensured. Moreover, the pet cat excrement screening device is small in size and simple and practical in structure. The screening mechanism in the form of the combination of the screening net 41 and the spiral collection bin 42 can screen a variety of cat litter, and the screening effect is excellent, so that the excrement of the pet cat in different cat litter can be efficiently screened out during the rotation of the drum 2. The pet cat excrement screening device is convenient to use.

The driven gear 22 of the drum 2 is an incomplete gear, so that the drum 2 rotates by less than 360 degrees during the rolling process. In this manner, an interlacing and shearing effect generated between the pet inlet 21 on the side wall of the drum 2 and the support base 1 is avoided, and an interlacing and shearing effect generated between the waste discharge outlet 23 of the device located at the rotation center of the end surface of the drum 2 and other parts is avoided, so that the pet has no risk of being pinched when using the device.

What is claimed is:

1. A pet cat excrement screening device, comprising:
a support base; a drum rotatably mounted on the support base; and a drum driving device mounted on the support base, wherein
the drum is configured to rotate between a first position and a second position under drive of the drum driving device, wherein a rotation angle of the drum is less than 360 degrees;
a side wall of a drum body of the drum is provided with a pet inlet, and the pet inlet is not covered by the support base during a rolling process of the drum;
a screening mechanism is mounted in the drum, the screening mechanism comprises a screening net and a spiral collection bin, a rear end of the drum is provided with a waste discharge outlet, and the spiral collection bin comprises a helicoid spirally curved towards the waste discharge outlet; and during the rolling process of the drum, the screening net is configured to screen out excrement of a pet cat onto the helicoid and screen out cat litter into a space between the spiral collection bin and a drum wall of the drum, and the helicoid is configured to guide the excrement into the waste discharge outlet with rotation of the drum;
the screening mechanism is secured between a front end surface of the drum and a rear end surface of the drum, the spiral collection bin and the screening net are secured relative to each other in an up and down direction, and the screening net is evenly provided with a plurality of screening holes; and
the helicoid is curved towards a rotation axis of the drum along a direction extending from a lower end of the helicoid to an upper end of the helicoid, and the helicoid is curved towards the drum wall of the drum along a direction extending from a front end of the helicoid to a rear end of the helicoid.

2. The pet cat excrement screening device according to claim 1, wherein a diameter of each of the plurality of screening holes is larger than a diameter of one piece of the cat litter and smaller than a diameter of one piece of the excrement of the pet cat the diameter of the each of the plurality of screening holes is between 2 mm and 10 mm.

3. The pet cat excrement screening device according to claim 1, wherein a deflector is mounted in the drum, a first end of the deflector is secured to the waste discharge outlet, a second end of the deflector abuts the spiral collection bin, the deflector comprises a deflector surface curved towards the waste discharge outlet, and the deflector surface is connected to the helicoid.

4. The pet cat excrement screening device according to claim 1, wherein an inner wall of the support base abutting the drum is symmetrically provided with a plurality of support wheels.

5. The pet cat excrement screening device according to claim 1, further comprising a waste discharge box, wherein the waste discharge box is mounted on the support base, and the waste discharge box is located directly below the waste discharge outlet.

6. The pet cat excrement screening device according to claim 1, further comprising an upper cover, wherein the upper cover is mounted on the support base, and the upper cover covers the drum.

7. The pet cat excrement screening device according to claim 1, wherein the drum driving device comprises a drive gear, one end of the drum is provided with a driven gear meshed with the drive gear; and wherein the driven gear is an incomplete gear, and a central angle between two ends of gear teeth of the driven gear is less than 360 degrees.

8. The pet cat excrement screening device according to claim 7, wherein the two ends of the gear teeth of the driven gear are provided with limit teeth.

* * * * *